United States Patent
Simakov et al.

(10) Patent No.: US 8,542,908 B2
(45) Date of Patent: Sep. 24, 2013

(54) BIDIRECTIONAL SIMILARITY OF SIGNALS

(75) Inventors: Denis Simakov, Jerusalem (IL); Michal Irani, Rehovot (IL); Yaron Caspi, Nes-Ziona (IL); Eli Schechtman, Rehovot (IL)

(73) Assignee: Yeda Research & Development Co. Ltd., Rehovot, IL (US)

( * ) Notice: Subject to any disclaimer, the term of this patent is extended or adjusted under 35 U.S.C. 154(b) by 728 days.

(21) Appl. No.: 12/598,450

(22) PCT Filed: May 11, 2008

(86) PCT No.: PCT/IL2008/000649
§ 371 (c)(1),
(2), (4) Date: Mar. 10, 2010

(87) PCT Pub. No.: WO2008/139465
PCT Pub. Date: Nov. 20, 2008

(65) Prior Publication Data
US 2010/0177955 A1    Jul. 15, 2010

Related U.S. Application Data

(60) Provisional application No. 60/917,109, filed on May 10, 2007, provisional application No. 61/014,052, filed on Dec. 16, 2007.

(51) Int. Cl.
*G06K 9/46* (2006.01)
(52) U.S. Cl.
USPC .......................................... 382/154; 382/218
(58) Field of Classification Search
USPC .............. 382/154, 218, 224, 298, 305; 707/6
See application file for complete search history.

(56) References Cited

U.S. PATENT DOCUMENTS

| | | | |
|---|---|---|---|
| 6,718,063 B1 * | 4/2004 | Lennon et al. | 382/224 |
| 6,917,699 B2 | 7/2005 | Sugawara | |
| 7,043,474 B2 * | 5/2006 | Mojsilovic et al. | 1/1 |
| 7,099,803 B1 | 8/2006 | Rappoport et al. | |
| 7,308,140 B2 * | 12/2007 | Shin et al. | 382/209 |
| 7,353,224 B2 * | 4/2008 | Chen et al. | 1/1 |
| 7,593,602 B2 * | 9/2009 | Stentiford | 382/305 |
| 7,801,893 B2 * | 9/2010 | Gulli' et al. | 707/737 |
| 2005/0100220 A1 | 5/2005 | Keaton et al. | |
| 2005/0123045 A1 | 6/2005 | Hannuksela | |

OTHER PUBLICATIONS

S. Avidan and A. Shamir: "Seam carving for content-aware image resizing", SIGGRAPH, 2007.
O.Boiman and M.Irani: "Similarity by composition". In NIPS. pp. 177-184. Vancouver, BC. Canada. 2007.

(Continued)

*Primary Examiner* — Sheela Chawan
(74) *Attorney, Agent, or Firm* — Eitan, Mehulal & Sadot

(57) ABSTRACT

A method for measuring bi-directional similarity between a first signal of a first size and a second signal of a second size includes matching at least some patches of the first signal with patches of the second signal for data completeness, matching at least some patches of the second signal with patches of the first signal for data coherence, calculating the bi-directional similarity measure as a function of the matched patches for coherence and the matched patches for completeness and indicating the similarity between the first signal and the second signal. Another method generates a second signal from a first signal where the second signal is different than the first signal by at least one parameter. The method includes attempting to maximize a bi-directional similarity measure between the second signal and the first signal.

54 Claims, 14 Drawing Sheets

(56) References Cited

OTHER PUBLICATIONS

L.Q. Chen et al: A visual attention model for adapting images on small displays. Multimedia Systems. 2003.
V.Cheung. B.J. Frey. And n. Jojic: Video epitomes. IJCV. Dec 2006.
A.A. Efros and T.K. Leung: Texture synthesis by non-parametric sampling. In ICCVB. pp. 1033-1038. 1999.
N. Jojic. B.J. Frey. and A.Kannan: Epitomic analysis of appearance and shape. In ICCV. 2003.
H.W. Kang. Y.Matsushita. X.Tang. and X.Q. Chen: Space-time video montage. In CVPR(2). 2006.
A.Kannan. J.Winn. and C.Rother: Clustering appearance and shape by learning jigsaws. NIPS. 2006.
F.Liu and M.Gleicher: Automatic image retargeting with fisheye-view warping. In UIST. 2005.
F.Liu and M.Gleicher: Video retargeting: Automating pan-and-scan. ACM Multimedia 2006. Oct. 2006.
A.Rav-Acha. Y.Pritch. and S.Peleg: Making a Long Video Short. In CVPR. Jun. 2006.
C.Rother. L. Bordeaux. Y. Hamad i. and A. Blake: Autocollage. SIGGRAPH. 25(3):847--852. 2006.
V.Setlur. S.Takagi. R.Raskar. M.Gleicher. and B.Gooch: Automatic image retargeting. In MUM. 2005.
B.Suh. H.Ling. B.B. Bederson. and D.W. Jacobs: Automatic thumbnail cropping and its effectiveness. In UIST. 2003.
L.Wolf. M.Guttmann. and D.Cohen-Or: Non-homogeneous content-driven video-retargeting. In ICCV'07.
Y.Pritch. A.Rav-Acha. A.Gutman. and S.Peleg: Webcam synopsis: Peeking around the world. In ICCV. 2007.
Y.Wexler. E.Shechtman. and M.Irani: Space-time completion of video. PAMI. 27(2). Mar. 2007.
D.M.Mount and S.Arya: A library for approximate nearest neighbor searching. 2006. ANN.
Pérez, P., Gangnet, M., and Blake: Poisson image editing. ACM Trans. Graph. 22, 3 (Jul. 2003), 313-318. DOI= http://doi.acm.org/10.1145/882262.882269".

\* cited by examiner

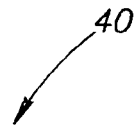

For all resolutions:
    for all pixels q of target T:
        define a patch Q around pixel q;       —41
        scan through all patches P in source S and measure the distance
            D(P,Q) between them;      —42
        select the most similar patch P in source S, being the one with the
            smallest distance D(P,Q) between them;
        $d_{cohere} = d_{cohere} + D(P,Q)$; —44
    for all pixels p of source S;
        define a patch P around pixel p;     —50
        scan through all patches Q in target T and measure the distance
            D(Q,P) between them;      —52
        select the most similar patch Q in target T, being the one with the
            smallest distance D(Q,P) between them;
        $d_{complete} = d_{complete} + D(Q,P)$; —54
$d(S,T) = d_{complete}/N_S + d_{cohere}/N_T$. —56

FIG.3D

Generate an initial guess for target $T_k$:
For all iterations $\ell$:
    for all resolutions:
        for all pixels q of target $T_k^\ell$:
            define a patch $Q_i$ around pixel q;
            scan through all patches P in source S and measure the distance
                $D(P,Q_i)$ between them;
            select the most similar patch $P_i$ in source S, being the one with the
                smallest distance $D(P_i,Q_i)$ between them;
    for all pixels p of source S:
        define a patch $\hat{P}_j$ around pixel p;
        scan through all patches $\hat{Q}$ in target $T_k^\ell$ and measure the distance
            $D(\hat{Q}, \hat{P}_j)$ between them;
        select the most similar patch $\hat{Q}_j$ in target $T_k^\ell$, being the one with the
            smallest distance $D(\hat{Q}_j,\hat{P}_j)$ between them;
Update intensities $T_k^{\ell+1}(q)$ from pixels associated to q in patches $P_i$ and $\hat{P}_j$;
Calculate $d(S, T_k^{\ell+1})$ and repeat iteration if not converged with $d(S,T_k^\ell)$

FIG.5

BIDIRECTIONAL SIMILARITY OF SIGNALS

CROSS-REFERENCE TO RELATED APPLICATIONS

This application is a U.S. National Phase Application under 35 U.S.C. 371 of PCT International Application No. PCT/IL2008/000649, which has an international filing date of May 11, 2008, and which claims benefit from U.S. Provisional Patent Application No. 60/917,109, filed May 10, 2007, U.S. Provisional Patent Application No. 61/014,052, filed Dec. 16, 2007, the contents of which are hereby incorporated in their entirety by reference.

FIELD OF THE INVENTION

The present invention relates to processing of signals and visual items generally and to determining their similarity in particular.

BACKGROUND OF THE INVENTION

It is often desired to display a large image or video in a different (usually smaller) size. This is common, for example, when generating image thumbnails, when obtaining short summaries of long videos, or when displaying images or videos on different screen sizes. It is generally desired that the smaller representation or the visual summary faithfully represent the original visual appearance and dynamics as best as possible, and be visually pleasing.

The simplest and most commonly used methods for generating smaller-sized visual displays are scaling and cropping. Image scaling maintains the entire global layout of the image, but compromises its visual resolution, and distorts the appearance of objects when the aspect ratio changes. Cropping, on the other hand, preserves visual resolution and appearance within the cropped region, but loses all visual information outside that region.

More sophisticated methods have been proposed for automatic "retargeting" by reorganizing the visual data (image or video) in a more compact way, while trying to preserve visual coherence of important (usually sparse) regions. These methods typically begin by first identifying important regions. The following articles describe some of these importance-based methods:

F. Liu and M. Gleicher. Automatic image retargeting with fisheye-view warping. In *UIST.* 2005.

V. Setlur. S. Takagi. R. Raskar. M. Gleicher. and B. Gooch. "Automatic image retargeting." In *MUM.* 2005.

L. Wolf. M. Guttmann. and D. Cohen-Or. "Non-homogeneous content-driven video-retargeting." In *ICCV '07.*

Existing retargeting methods can roughly be classified into three families:

(i) Importance-based scaling methods first identify important regions within the image (e.g., salient regions, faces, high-motion regions). The outputs of these methods are characterized by scaling-down of unimportant regions (e.g., the background), while the important regions are preserved as close as possible to their original size (e.g., foreground objects). These methods work well when there are only a few "important" objects within an image. However, these methods reduce to pure image scaling if there is uniform importance throughout the image.

(ii) Importance-based cropping methods provide acceptable results when the interesting information is concentrated in one region (spatial or temporal).

(iii) Object segmentation methods correct for the main deficiency of cropping—the inability to capture spatially or temporally separated objects—by compact packing (spatial and/or temporal) of segmented important/salient regions/blobs.

Most importance-based methods require the important regions to be relatively compact and sparse within the visual data. In contrast, the "Seam Carving" approach (described in the article "Seam carving for content-aware image resizing" by S. Avidan and A. Shamir, SIGGRAPH, 2007) does not rely on compactness/sparseness of important information. It removes uniform regions scattered throughout the image, by carving out vertical and horizontal pixel-wide seams that have low gradient content. As long as there are enough low-gradient pixels to remove, the results are pleasing. However, eventually all of the low gradient pixels have already been removed and further shrinking by "Seam Carving" can actually deform important image content. This is especially evident when the interesting object(s) span over the entire image.

SUMMARY OF THE PRESENT INVENTION

There is provided, in accordance with a preferred embodiment of the present invention, a method for measuring bi-directional similarity between a first signal of a first size and a second signal of a second size includes matching at least some patches of the first signal with patches of the second signal for data completeness, matching at least some patches of the second signal with patches of the first signal for data coherence, calculating the bi-directional similarity measure as a function of the matched patches for coherence and the matched patches for completeness and indicating the similarity between the first signal and the second signal.

Moreover, in accordance with a preferred embodiment of the present invention, at least one of the signals is a multiplicity of signals or a portion of a signal.

Further, in accordance with a preferred embodiment of the present invention, the method is operative for at least one of the following applications: classification, search, retrieval, signal categorization, detection and finding a cropping region of the first signal.

Additionally, in accordance with a preferred embodiment of the present invention, the signals may be audio signals, images, video sequences and/or N-dimensional signals.

Further, in accordance with a preferred embodiment of the present invention, the patches are at least one of spatial patches, temporal patches, space-time patches and/or N-dimensional patches.

Still further, in accordance with a preferred embodiment of the present invention, the patches are represented by patch descriptors.

Additionally, in accordance with a preferred embodiment of the present invention, the calculating includes evaluating a distance between a patch and its matched patch. The evaluating may be performed with any of the following distance measures: SSD, SAD, Lp-distance, Frobenious norm, correlation, normalized correlation, mutual information, KL (Kullback-Leibler)-distance, EMD (earth-mover's distance), Hamming distance, and distances between empirical distributions.

Further, in accordance with a preferred embodiment of the present invention, the matching is computed in at least one scale.

Moreover, in accordance with a preferred embodiment of the present invention, the similarity is measured by:

$$d(S, T) = \alpha \cdot \overbrace{\frac{1}{N_S} \sum_{P \subset S} \min_{Q \subset T} D(P, Q)}^{d_{complete}(S,T)} + (1 - \alpha) \cdot \overbrace{\frac{1}{N_T} \sum_{Q \subset T} \min_{P \subset S} D(Q, P)}^{d_{cohere}(S,T)}$$

where S is the first signal, T is the second signal, P and Q are patches in S and T, respectively, $N_S$ and $N_T$ denote the number of patches in S and T, respectively, and $0 \le \alpha \le 1$.

Additionally, in accordance with a preferred embodiment of the present invention, the calculating uses importance weights for the patches.

Moreover, in accordance with a preferred embodiment of the present invention, the importance weights are either provided externally or are a function of information in at least one of the signals.

There is also provided, in accordance with a preferred embodiment of the present invention, a method which generates a second signal from a first signal where the second signal is different than the first signal by at least one parameter. The method includes attempting to maximize a bi-directional similarity measure between the second signal and the first signal.

Additionally, in accordance with a preferred embodiment of the present invention, the bi-directional similarity measure measures the level of completeness and coherence of the second signal with respect to the first signal.

Further, in accordance with a preferred embodiment of the present invention, the at least one parameter is at least one of size, dimension, aspect ratio, and geometric shape.

Still further, in accordance with a preferred embodiment of the present invention, the first and second signals are visual items.

Moreover, in accordance with a preferred embodiment of the present invention, the generating includes generating a progression of intermediate signals from the first signal to the second signal, wherein each intermediate signal is as complete and coherent as possible with respect to the first signal.

Additionally, in accordance with a preferred embodiment of the present invention, the generating is operative for signal/image/video summarization, image/video thumbnail generation, morphing from the first signal to the second signal, texture warping, signal/image/video synthesis, image/video collage/montage, signal combination, signal reshuffling, reshuffling portions of signals and removal of portions of signals.

Moreover, in accordance with a preferred embodiment of the present invention, the first and second signals are of different signal types. The signals may be a video sequence and an image, an image and a three dimensional color surface, an image and a mesh, a three dimensional color surface and an image, or a photo collage and a three dimensional color surface.

Further, in accordance with a preferred embodiment of the present invention, the signals are three dimensional shapes and the second signal is a shape summary of the first signal.

Still further, in accordance with a preferred embodiment of the present invention, the generating is operative to extract a texture seed useful for synthesizing a new similar texture.

Additionally, in accordance with a preferred embodiment of the present invention, the attempting to maximize includes starting with at least one initial guess for the second signal, matching patches of the second signal with patches of the first signal for coherence, matching patches of the first signal with patches of the second signal for completeness, and updating values of the second signal using data from the matched patches to increase completeness and coherence.

Moreover, in accordance with a preferred embodiment of the present invention, the updating includes utilizing importance weights for the patches.

Additionally, in accordance with a preferred embodiment of the present invention, the method also includes determining the weights as a function of information in at least one of the signals. The importance weights can be provided externally or as a function of information in at least one of the signals.

Additionally, in accordance with a preferred embodiment of the present invention, the method also includes iterating the matching and the updating and using locations of matches from a previous iteration to increase a matching speed for the iterating.

Moreover, in accordance with a preferred embodiment of the present invention, the method also includes determining a best size of the second signal according to values of the similarity measure.

Further, in accordance with a preferred embodiment of the present invention, the starting includes receiving a selection of at least one portion of the first signal and receiving an indication of at least one location in at least one of space and time in which to place the selection into the initial guess.

There is also provided, in accordance with a preferred embodiment of the present invention, a method for generating a compact signal from a first signal. The method includes removing at least a redundant portion from the first signal while maintaining the compact signal as complete and coherent as possible with respect to the first signal.

There is still further provided, in accordance with a preferred embodiment of the present invention, apparatus for generating a second signal from a first signal, where the second signal is different than the first signal by at least one parameter. The apparatus includes a generator to attempt, during generation, to maximize a bi-directional similarity measure between the second signal and the first signal and a storage unit to store the first and the second signal.

Moreover, in accordance with a preferred embodiment of the present invention, the bi-directional similarity measure measures the level of completeness and coherence of the second signal with respect to the first signal.

Further, in accordance with a preferred embodiment of the present invention, the generator includes a unit to generate a progression of intermediate signals from the first signal to the second signal, wherein each intermediate signal is as complete and coherent as possible with respect to the first signal.

Still further, in accordance with a preferred embodiment of the present invention, the apparatus is operative for at least one of the following operations: signal/image/video summarization, image/video thumbnail generation, morphing from the first signal to the second signal, texture warping, signal/image/video synthesis, image/video collage/montage, signal combination, signal reshuffling, reshuffling portions of signals and removal of portions of signals. The apparatus is also operative to extract a texture seed useful for synthesizing a new similar texture.

Additionally, in accordance with a preferred embodiment of the present invention, the generator includes a starter, a matcher and an updater. The starter starts with at least one initial guess for the second signal. The matcher matches patches of the second signal with patches of the first signal for coherence and to match patches of the first signal with patches of the second signal for completeness. The updater updates values of the second signal using data from the matched patches to increase completeness and coherence.

Moreover, in accordance with a preferred embodiment of the present invention, the updater includes a weighter to utilize importance weights for the patches.

Further, in accordance with a preferred embodiment of the present invention, the apparatus also includes a weight determiner to determine the weights as a function of information in at least one of the signals.

Still further, in accordance with a preferred embodiment of the present invention, the apparatus also includes an iterater to iteratively activate the matcher and the updater, the iterater using locations of matches from a previous iteration to increase a matching speed of a current iteration.

Moreover, in accordance with a preferred embodiment of the present invention, the updater includes an evaluator to evaluate a distance between a patch and its matched patch. The evaluater utilizes using at least one of the following distance measures: SSD, SAD, Lp-distance, Frobenious norm, correlation, normalized correlation, mutual information, KL (Kullback-Leibler)-distance, EMD (earth-mover's distance), Hamming distance and distances between empirical distributions.

Further, in accordance with a preferred embodiment of the present invention, the matcher and the updater operate at least one scale.

Still further, in accordance with a preferred embodiment of the present invention, the apparatus also includes a size determiner to determine a best size of the second signal according to values of the similarity measure.

Additionally, in accordance with a preferred embodiment of the present invention, the starter includes a selection receiver which receives a selection of at least one portion of the first signal and an indication receiver which receives an indication of at least one location in at least one of space and time in which to place the selection into the initial guess.

Finally, there is provided, in accordance with a preferred embodiment of the present invention, apparatus for generating a compact signal from a first signal. The apparatus includes a signal receiver to receive the first signal and a generator to remove at least a redundant portion from the first signal while maintaining the compact signal as complete and coherent as possible with respect to the first signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A is a schematic illustration of a scanning process for matching patches of source and target images, and FIGS. 3B and 3C are schematic illustrations of completeness and coherence calculations, respectively;

FIG. 3D is a pseudo-code illustration of the method to compute the bi-directional measure d(S,T);

FIG. 5 is a pseudo-code illustration of a method for generating target images from source images using dissimilarity measure d(S,T), constructed and operative in accordance with a preferred embodiment of the present invention;

Figure 1:
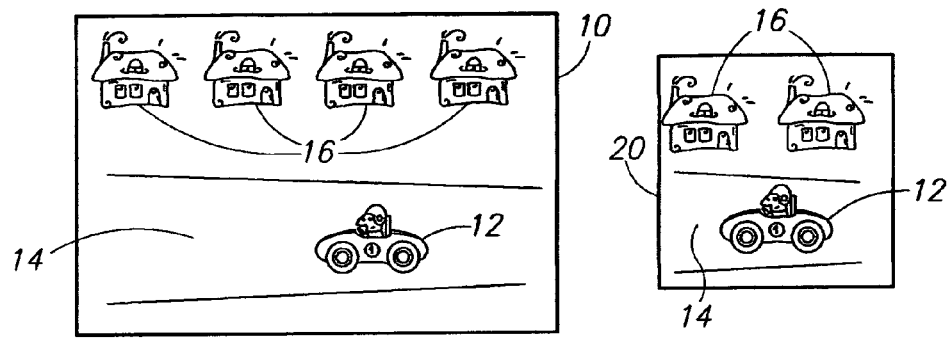
FIG. 1 is an illustration of exemplary source image and an exemplary target (or summary) image.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which shows a source image, image 10, and a target image, image 20. Image 10 shows a car 12, on a mad 14, driving past four similar houses 16. Image 20 shows a smaller version of image 10. It also has car 12 and road 14 but only two of houses 16. Image 20, which also has car 12, road 14 and only two of houses 16, is clearly a fine summary of image 10. But, image 10 is a fairly simple image. How might one quantify a visual summary for more complicated images?

Applicants have realized that, while the image retargeting methods discussed hereinabove provide step-by-step algorithms for producing a visual summary, each method results in its own significantly different visual summary for the same input image. The present invention may be a method to quantify how "good" a visual summary is. Such a quantification may be useful for two purposes: (i) to quantitatively compare and evaluate visual summaries produced by different methods; and (ii) as an objective function within an optimization process to generate good visual summaries.

In accordance with a preferred embodiment of the present invention, two visual items, a source S and a target T, irrespective of their size, may be similar if a) target T may represent nearly all the visual data in source S (a completeness requirement); and b) target T does not introduce new visual artifacts that were not observed in source S (a coherence requirement). In other words, two visual items S and T may be considered visually similar if as many as possible patches of S (at multiple scales) are contained in T, and vice versa. It will be appreciated that visual items S and T may be images or video sequences.

Figure 2:
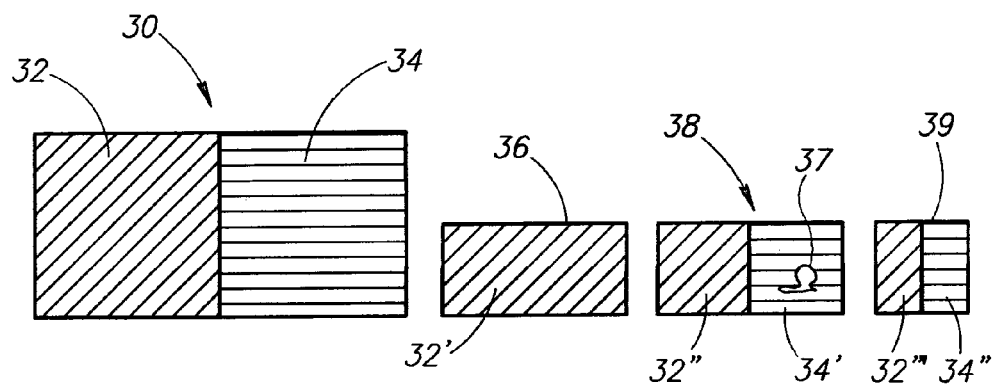
FIG. 2 is an illustration of a second exemplary source image and three exemplary target images for it.

FIG. 2 shows a simple exemplary source image 30, having two areas 32 and 34 therein, each having a different color (shown in FIG. 2 as different hatching). Target image 36, which has only one area 32' therein, may be a coherent version of source image 30, since all the patches of target image 36 may exist in area 32 of source image 30. But it is not complete with source image 30, since there are patches from area 34 of source image 30 which are not in target image 36.

Like source image 30, target image 38 has two areas in it, here labeled 32" and 34', where areas 32" and 34' of target image 38 have the same colors as areas 32 and 34, respectively, of source image 30 and area 34' also has a flower 37 in it. Target image 38 may be complete with source image 30, since each patch of source image 30 (up to a certain size) may have a similar patch in target image 38. However, target image 38 is not coherent with source image 30 since flower 37 does not exist in source image 30 and thus, there are patches of area 34' that do not have matching patches in any area of source image 30.

Target image 39 has two areas in it, labeled 32''' and 34''', where both areas have the same colors as areas 32 and 34, respectively, of source image 30. Target image 39 may be both complete and coherent with source image 30, since each patch of source image 30 has a similar patch in target image 39 and each patch in target image 39 has a similar patch in source image 30.

The concepts of completeness and coherence are combined mathematically in a dissimilarity measure, as follows:

$$d(S,T) = \overbrace{\frac{1}{N_S} \sum_{P \subset S} \min_{Q \subset T} D(P,Q)}^{d_{complete}(S,T)} + \overbrace{\frac{1}{N_T} \sum_{Q \subset T} \min_{P \subset S} D(Q,P)}^{d_{cohere}(S,T)} \quad (1)$$

where S and T need not be visual items of the same size (T may be smaller than S (for data summarization), or larger than S (for data synthesis)), P and Q denote patches in S and T, respectively, and $N_S$ and $N_T$ denote the number of patches in S and T, respectively. The larger d(S,T) is, the more dissimilar the two visual items S and T are.

Figure 3A:
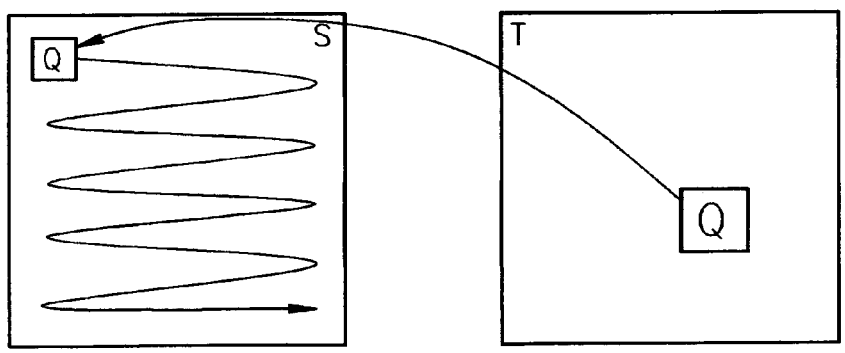
FIGS. 3A, 3B and 3C are schematic illustrations of a method to determine a bi-directional dissimilarity measure d(S,T), in accordance with a preferred embodiment of the present invention, where
Figure 3B:
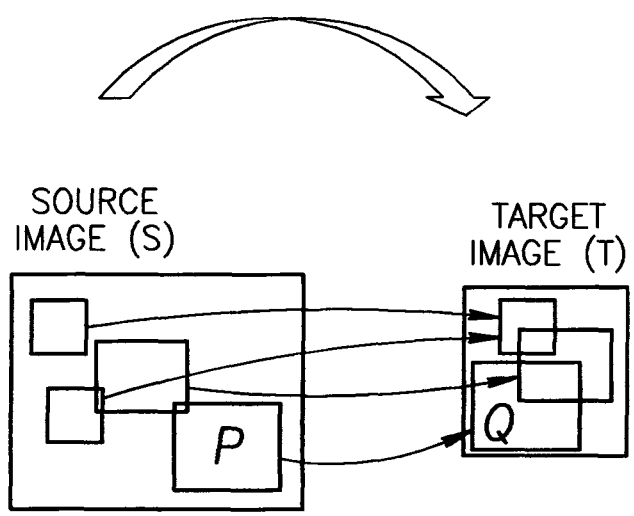
Figure 3C:
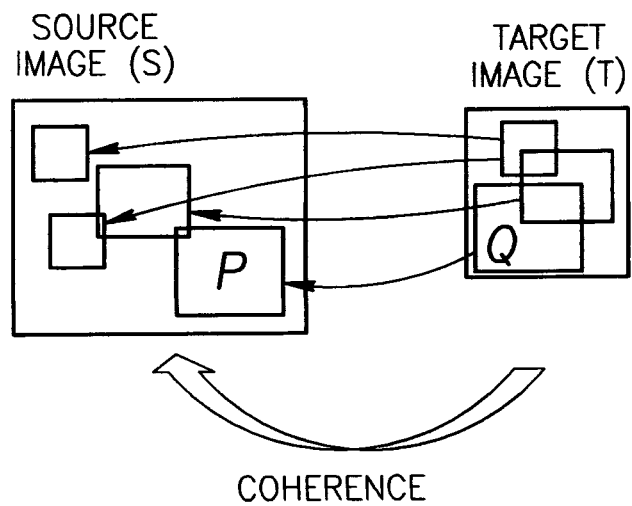

FIGS. 3A, 3B, 3C and 3D, to whom reference is now made, illustrate a method 40 to determine the bi-directional measure of Equation 1, where FIGS. 3A, 3B and 3C are schematic and FIG. 3D lists the steps of the method to compute the measure. As shown in FIG. 3A, for every patch Q in target T, the present invention may scan (step 41) through source S to find the most similar patch P in source S, being the one with the smallest distance D(P,Q) between them (step 42). The patches may be taken around every pixel q and at multiple scales (i.e., patches may significantly overlap). FIG. 3C shows a plurality of patches Q of different scales matched to a plurality of patches P in source S. Distances D(P,Q) between these Q and matched P may be added together (step 44), to generate a preliminary version of the $d_{cohere}(S,T)$ term.

Similarly, for the $d_{complete}(S,T)$ term, shown in FIG. 3B. For every patch P in source S, the present invention may search (steps 50 and 52) for the most similar patch Q in target T. These may be added together (step 54), to generate a preliminary version of the $d_{complete}(S,T)$ term. FIG. 3B shows a plurality of patches P of different scales matched to a plurality of patches Q in target T.

Finally, in step 56, dissimilarity measure d(S,T) may be generated by adding together the preliminary version of $d_{complete}$ divided by $N_S$ and the preliminary version of $d_{cohere}$ divided by $N_T$.

Note that the above formulation may be extended to a multiplicity of visual items. Source S and target T may be sets of visual items of possibly different sizes: S={S1, S2, ..., Sn}, T={T1, T2, ..., Tm}, 1≤n, 1≤m. The dissimilarity measure d(S,T) may be defined in terms of patches, therefore d(S,T) for such S, T may be computed by taking unions of sets of patches in all Si for the source and in all Tj for the target. This also applies to all the methods below.

If desired, the two terms may be weighted, thereby changing their importance with respect to each other. This may be mathematically defined as:

$$d(S,T) = a * d_{complete}(S,T) + (1-a) * d_{cohere}(S,T) \quad (2)$$

Note that in some cases (especially when there are more than one source S), full completeness may be hard to achieve and some patches may not find good matches in target T. These patches may be averaged with others, which might cause some blurriness artifacts. In this case, the completeness term may be computed only for the portion of the source patches with the best matches (e.g. 90% of the patches with top matching scores).

The distances D(P,Q) and D(Q,P) in Eq. 1 may be any distance measure between two patches. For example, it may be an SSD (Sum of Squared Distances), measured in CIE L*a*b* color space and normalized by the patch size. It will be appreciated that different measures may be used, depending on the application. For example, any of the following measures may be used (separately or combined): a (normalized) sum of square differences, a "robust" function of the differences (such as an SAD—sum of absolute differences, or a truncated SSD), (normalized) correlations, robust feature descriptors (such as SIFT, moments, rotation/scale/affine-invariant descriptors, etc.), mutual information, a Kullback-Leibler distance, a Mahalanobis distance, an Lp distance (p=1, 2, ..., infinity), an Earth-Mover's-Distance, a chi-2 histogram distance, a Frobenious norm, a Hamming distance and distances between empirical distributions. The values representing patches may be different and may capture different features, such as color values (RGB, CIE L*a*b*, Yuv, other color spaces), intensities, (normalized) color gradients, motion, locations inside the visual item, empirical distributions (e.g., a histogram, a Gaussian mixture model, etc.).

Figure 4:
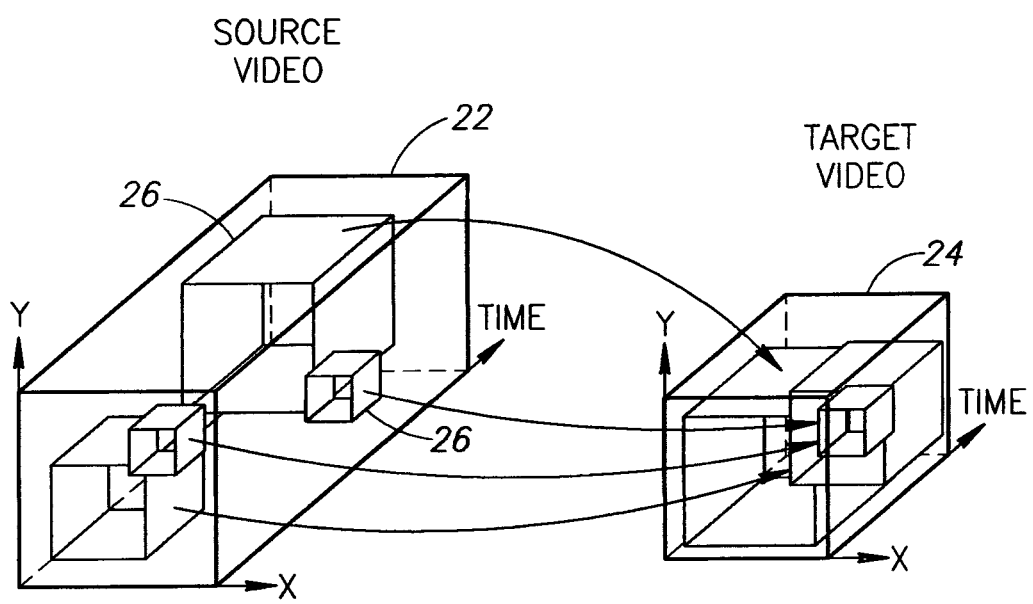
FIG. 4 is a schematic illustration of the completeness operation of FIG. 3B for source and target video sequences.

It will be appreciated that, the present invention may directly capture spatial relationships by treating images as unordered sets of all of their overlapping patches and by using the visual appearances of the patches. This may be true for video sequences as well as for images. FIG. 4, to which reference is now briefly made, shows a source video sequence 22 and a target video sequence 24, typically of a different size and/or of a different temporal duration and/or with a different aspect ratio than source video sequence 22. Here, the patches are space-time patches 26 which are mapped from source video sequence 22 to target video sequence 24 and vice-versa. Thus, for video sequences, the present invention may capture spatio-temporal relationships directly using the visual appearance of the spatial-temporal patches 26.

It will further be appreciated that, although the present specification describes the invention using visual items, these are examples only. The bi-directional dissimilarity measure may also be utilized for other kinds of signals, such as audio signals or N-dimensional signals, where N is 1, 2, 3 or more.

In order to capture bi-directional dissimilarity both locally and globally, the completeness and coherence terms may be computed at multiple scales. For example, visual items S and T may be compared at multiple (corresponding) resolutions within a Gaussian pyramid. For example, for images, patches of 7×7 pixels may be employed to compare corresponding pyramid levels (a small 7×7 patch in a coarse scale may correspond to a large patch in a fine scale). For example, for video sequences, 7×7×5 patches of a space-time pyramid may be employed. It will be appreciated that patches of other sizes and shapes (square, rectangular, other shapes, etc) may also be utilized.

While the two terms in Eq. 1 seem very similar to each other, they have important complementary roles. The first term, $d_{complete}(S,T)$, measures the deviation of the target T from "completeness" with source S. Namely, it measures if all patches of S (at multiple scales) have been preserved in T (or, how well S can be reconstructed from T). The second term, $d_{cohere}(S,T)$, measures the deviation of the target T from "coherence" with source S. Namely, it measures if there are any "newborn" patches in T which did not originate from S (i.e., new undesired visual artifacts).

It will be appreciated that the present invention may exploit the redundancy of image patterns (i.e. the houses in FIG. 1 or the background plants in FIG. 7) by mapping repetitive patches in the source image to the same few representative patches in the target image, thus preserving their appearance at the original scale.

Each of the terms of Eq. 1 have been separately employed for other purposes. For example, the completeness term alone resembles the objective function optimized in the "Epitome" work of V. Cheung. B. J. Frey. and N. Jojic in "Video epitomes", *IJCV*, December 2006. The coherence term is similar to the objective function optimized in the data completion work of Y. Wexler. E. Shechtman. and M. Irani, in "Space-time completion of video," *PAMI.* 27(2), March 2007. However, the combination of the two terms together is novel.

The dissimilarity measure d(S,T) may be simple to use for comparing images or video sequences of different sizes. Moreover, its simple mathematical formulation may be convenient for analytical derivations.

Figure 6A:
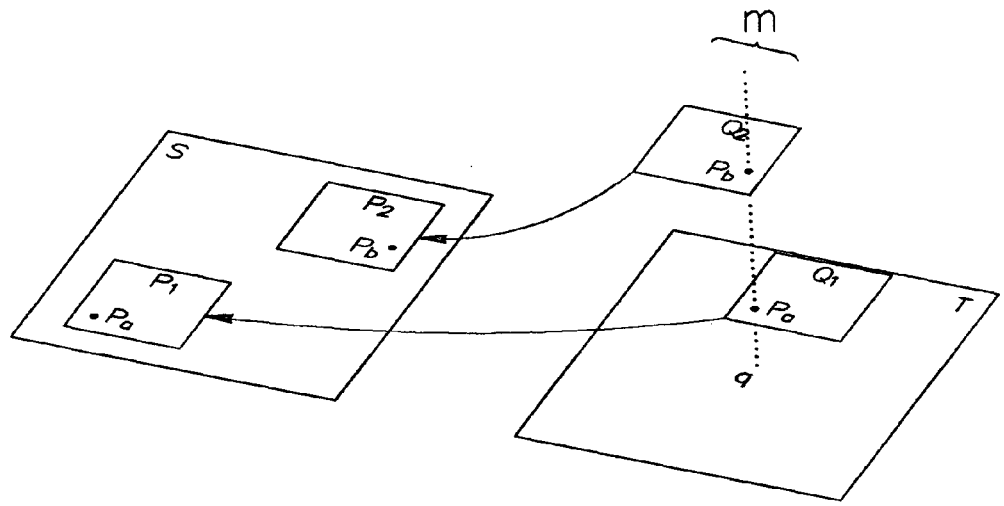
FIGS. 6A and 6B are schematic illustrations, useful in understanding the method of FIG. 5.
Figure 6B:
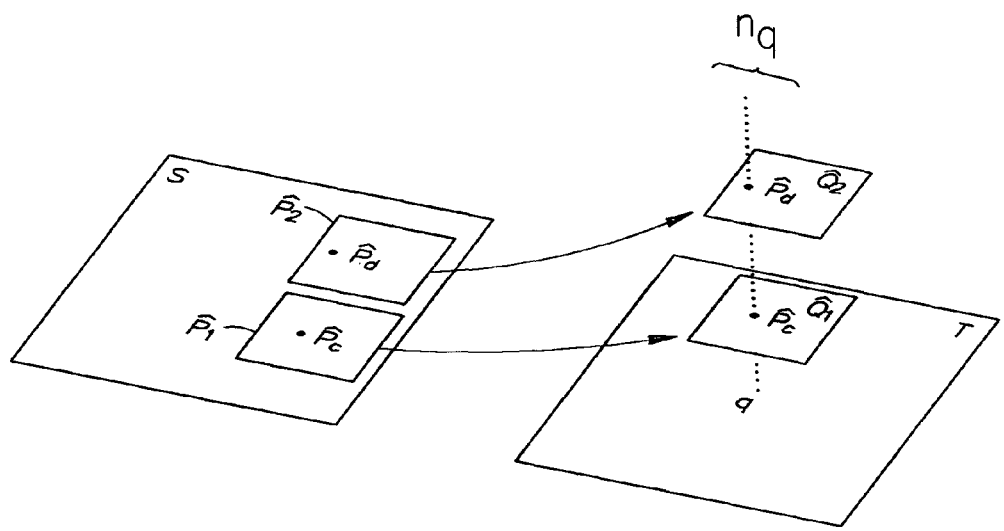

Reference is now made to FIG. 5, which illustrates a method 70 for generating target images from source images using dissimilarity measure d(S,T). Reference is also made to FIGS. 6A and 6B, which conceptually illustrate an update rule used in the method of FIG. 5.

Method 70 may attempt to find a target visual item T that generally optimizes dissimilarity measure d(S,T) with respect to source visual item S. Formally, it may search for a $T_{output}$ such that:

$$T_{output} = \arg\min_T d(S, T) \quad (3)$$

Method 70 may generate (step 60) an initial guess $T_k^0$ for target $T_k$, as will be discussed in more detail hereinbelow. With the initial guess for $T_k$ method 70 may iterate until convergence is achieved. For each iteration l, method 70 may perform the coherence matching, completeness matching, and an updating of target colors.

Method 70 may perform coherence matching steps, here labeled 41' and 42' between current guess $T_k^l$ and source visual item S at various resolutions. For each patch $Q_i$ in $T_k^l$ this may result in a matching patch $P_i$ in S, which has minimal $D(P_i, Q_i)$.

Method 70 may also perform completeness matching steps, here labeled 50' and 52', between a current guess $T_k^l$ and a source visual item S at various resolutions. For each patch $\hat{P}_j$ in S, this may result in a matching patch $\hat{Q}_j$ in $T_k^l$, which may have a minimal value for $D(\hat{P}_j, \hat{Q}_j)$.

The searches for the best matches of each source patch in the target and of each target patch in the source may be performed simultaneously. In this embodiment, the source and target visual items may be shifted with respect to each other and values may be subtracted and integrated over appropriate windows (this may compute D(P,Q) between P and Q at a particular shift). The best matches for both completeness and coherence may be updated using these values. The procedure may be repeated for all possible shifts. In the end, $$\min_P D(P, Q) \text{ and } \min_Q D(P, Q)$$

may be computed for all P and for all Q.

Another approach to computing matching patches is to use an Approximate Nearest Neighbor algorithm, such as the one described in the article by D. M. Mount and S. Arya, 2006. "ANN: A library for approximate nearest neighbor searching". Dimensionality reduction (e.g., PCA) may also be used to make the nearest-neighbor search more practical.

Until now, method 70 merely found the best matches. In step 68, which may be performed for each pixel q of target visual item $T_k^{l+1}$, method 70 may use matched patches $(P_i, Q_i)$ and $(\hat{P}_j, \hat{Q}_j)$ to generate the next target visual item $T_k^{l+1}$ which may improve dissimilarity measure d(S,T) with respect to source visual item S. To determine the update rule used by step 68, consider FIGS. 6A and 6B. FIG. 6A shows the coherence term, with two patches $P_1$ and $P_2$ from source S matched to two patches $Q_1$ and $Q_2$ in target T. FIG. 6B shows the completeness term, with two patches $\hat{P}_1$ and $\hat{P}_2$ from source S matched to two patches $\hat{Q}_1$ and $\hat{Q}_2$ in target T.

As can be seen, a pixel q of target T lies within each of patches $Q_1$ and $Q_2$ for the coherence term and within patches $\hat{Q}_1$ and $\hat{Q}_2$ for the completeness term. As can also be seen, patches $Q_1$ and $Q_2$ are not the same as patches $\hat{Q}_1$ and $\hat{Q}_2$. Moreover, pixel q may lie in a different section of each matched patch. Thus, pixel q may correspond to pixel $p_a$ in the lower left-hand corner of patch $Q_1$ and to pixel $p_b$ in the lower right of patch $Q_2$. Similarly, in FIG. 6B, pixel q may correspond to pixel $\hat{p}_c$ towards the middle of patch $\hat{Q}_1$ and to pixel $\hat{p}_d$ in the middle left of patch $\hat{Q}_2$.

It will be appreciated that FIGS. 6A and 6B are exemplary; there typically may be many more matched patches for each case. In fact, pixel q may be matched to m patches for the coherence term and to $n_q$ patches for the completeness term. Patches for the coherence term typically (but not necessarily) may be sampled on a regular grid, so, if 7×7 patches were used for a single scale, there will be 49 patches for each pixel (m=49).

The number $n_q$ of patches contributing to the pixel q in the completeness term will be determined by the current content of the source and the target. Typically, in the target regions which represent an object which is unique in the source (e.g., a person, an animal) the number of source patches per target pixel will be also constant (i.e., $n_q$=49 in the above example). In contrast, in the target regions which represent redundant (or repetitive) source regions (e.g., grass, flower field, wall sections, windows of a building, etc.), the repetitive patches may be mapped to the same few representative patches in the target image and thus, the number of matching source patches may be larger, resulting in a larger value for $n_q$ ($n_q$>49 in the above example).

The color of pixel q may contribute an error to the coherence and completeness terms $d_{cohere}(S,T)$ and $d_{complete}(S,T)$, respectively. The amount it contributes may be expressed as:

$$Err(T(q)) = \frac{1}{N_S} \sum_{j=1}^{n_q} (S(\hat{p}_j) - T(q))^2 + \frac{1}{N_T} \sum_{i=1}^{m} (S(p_i) - T(q))^2 \quad (4)$$

where $T(q)$ is the current intensity (or color) of pixel q, $p_i$ is the pixel in $P_i$ with the same relative location as pixel q in $Q_i$, $\hat{p}_j$ is the pixel in $\hat{P}_j$ with the same relative location as pixel q in $\hat{Q}_j$.

To find the color $T(q)$ which minimizes the error in Eq. (4), $Err(T(q))$ may be differentiated with respect to the unknown color $T(q)$ and equated to zero, leading to the following expression for the generally optimal color of pixel q, which expression is implemented in step 68:

$$T(q) = \frac{\frac{1}{N_S}\sum_{j=1}^{n_q} S(\hat{p}_j) + \frac{1}{N_T}\sum_{i=1}^{m} S(p_i)}{\frac{n_q}{N_S} + \frac{m}{N_T}} \quad (5)$$

Note that in Equation 5, the value of the target item is computed as a weighted average of values of the source item (from the matching patches). However, other operations may be used. For example, if the patch distance D(S,T) is a sum-of-absolute-differences (instead of a sum-of-square-differences), the relevant expression which optimizes the error function may be a weighted median. Other methods may improve the quality of the result. For example, matching source values may be clustered together, such as via k-means, or a mean-shift algorithm, etc. and then selecting the center of the largest cluster. This may improve the sharpness of the result.

The matched patches found in the previous iteration may be utilized to speed up a nearest-neighbor search in the next iteration. In particular, the search may be only in small neighborhoods of the match from the previous iteration.

It will be appreciated that method 70 may be highly parallelizable and may be sped up on multiple central processing units (CPUs) or on a graphic processing unit (GPU). Finding the most similar patch may be done independently for each point, and, after all patch matches are found, target values may also be updated independently of one another.

Different sets of patches may be used, such as patches around each pixel and at each scale, patches around some subset of pixels (e.g., each $4^{th}$ pixel in each dimension), more patches in certain regions (e.g., regions with strong edges) and less patches in other regions (e.g., regions of slowly changing values), etc. Using appropriate sets of patches may result in a faster method with minimal (if any) loss of quality of the results.

The comparisons and operations of method 70 may alternatively be performed in the gradient domain (i.e. all source items may be replaced by their gradients). An additional step may be added, where the target item may be reconstructed from its gradient-domain representation (e.g., solving a Poisson equation, etc.). This may be especially useful when source items come from different sources and are not very similar in their values (colors/intensities/amplitude).

Method 70 is an iterative method. As in any iterative algorithm with a non-convex error surface, the local refinement process may converge to a good solution only if the initial guess is "close enough" to the solution. But what would be a good initial guess in this case? Obviously the "gap" in size (and hence in appearance) between the source image S and the final target image T is usually too large for a trivial initial guess to suffice. A random guess, in general, is not good. Simple cropping of S to the final size of T may not be good, because most of the source patches would have been discarded and would not be recoverable in the iterative refinement process. Scaling down of S to the final size of T may not be a good initial guess either, because the appearance of scaled-down patches is dramatically different from the appearance of source patches, also preventing recovery of source patches in the iterative refinement process.

If, on the other hand, the "gap" in size between the source S and target T were only minor (e.g., $|T|=0.95 |S|$, where $|\cdot|$ denotes the size), then subtle scaling down of the source image S to the size of T may serve as a good initial guess (since all source patches are present, but with minor changes in appearance).

Figure 7:
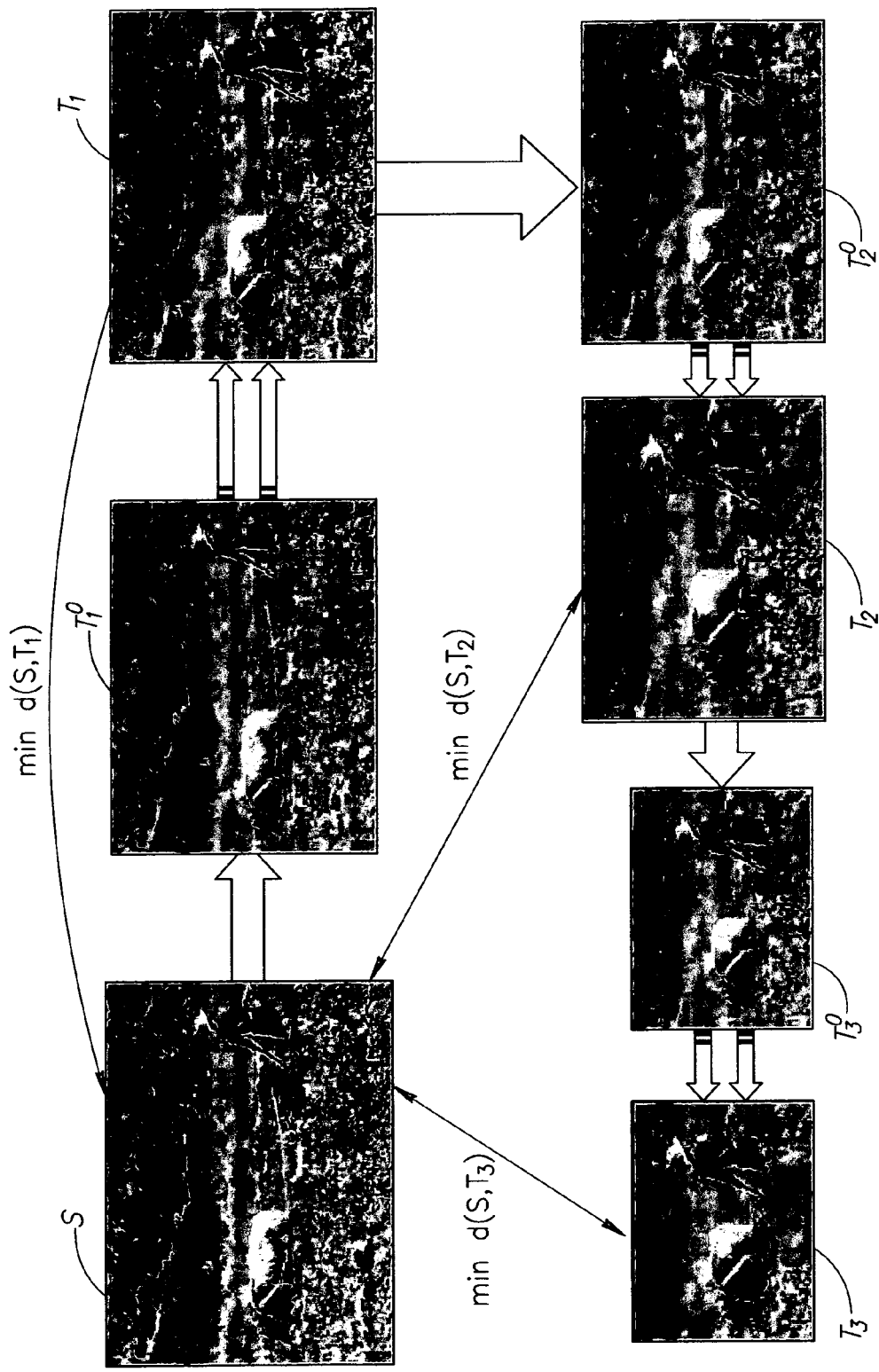
FIG. 7 is an illustration of a gradual resizing process, implementable in the method of FIG. 5.

Following this logic, method 70 may implement a gradual resizing process, illustrated in FIG. 7. A sequence of intermediate target images $T_0, T_1, \ldots, T_K$ of gradually decreasing sizes ($|S|=|T_0|>|T_1|>\ldots>|T_K|=|T|$) may be produced. For each intermediate target $T_k$ (k=1, ..., K), a few refinement iterations (shown with the double arrows) may be performed. The target $T_k^0$ may first be initialized (step 60) to be a slightly scaled-down version (e.g. 80-95%) of the previously generated target $T_{k-1}$. Then, method 70 may be performed, finding matching pairs of patches $(P_i, Q_i)$ and $(\hat{P}_j, \hat{Q}_j)$ (steps 41', 42', 50', 52') and then updating (step 68) the image to generate $T_k^l$. Method 40 may be performed to determine the value of dissimilarity measure $d(S,T_k)$ for each intermediate target $T_k$. Method 70 may be repeated until convergence is obtained for the k-th target size, $T_k^L$=arg min $d(S,T_k)$.

This gradual resizing may guarantee that at each intermediate output size (k=1, ..., K), the initial guess $T_k^0$ may be generally close to the desired optimum of $T_k$. Note that the bidirectional distance measure $d(S,T_k)$ may be minimized with respect to the original source image S, since the goal is to obtain a final desired output summary $T=T_K$ that will minimize $d(S,T)$. An example sequence of image summaries of gradually decreasing sizes is shown in FIG. 7. Note that the ox and man in each scaled down version $T_k^0$ are relatively small while, in the final iteration $T_k^l$, the ox and man are closer to their original size in source S.

In addition to regular scaling, other methods (e.g., seam-carving, non-linear scaling etc.) may be employed to create a slightly scaled initial guess for each step in the gradual resizing procedure.

The gradual resizing procedure may be implemented coarse-to-fine within a Gaussian pyramid (spatial in the case of images, spatio-temporal in the case of videos). Each iteration may be performed with only one patch size and the patch size may change between iterations. Iterations may be performed at the coarsest level, $T_2^i$ at a finer level, and so on, until the original resolution may be reached. Such a multi-scale approach may enable the present invention to escape local minima and to speed up overall convergence.

For example, such gradual resizing coarse-to-fine procedure may be done as follows: starting at a low resolution (e.g., source image and target image are 30×30 pixels), the size of the source image may gradually be increased (e.g., 35×35, 40×40, ..., 90×90), while size of the target image may be kept the same (30×30). This may be equivalent to gradual decreasing the target size and simultaneously increasing the resolution level in the Gaussian pyramid, in order to maintain the working size of the target image. After each change of size, method 70 may be performed until convergence to the optimum of d(S,T). When the desired ratio between the source and target items may be achieved (e.g., 1:3-source is 90×90 pixels and target is 30×30 pixels), both source and target sizes may be increased simultaneously to reach their full resolution (i.e. at each step, source is 90×90, 135×135, . . . , 450×450 and the target is 30×30, 45×45, . . . , 150×150).

Figure 8A:
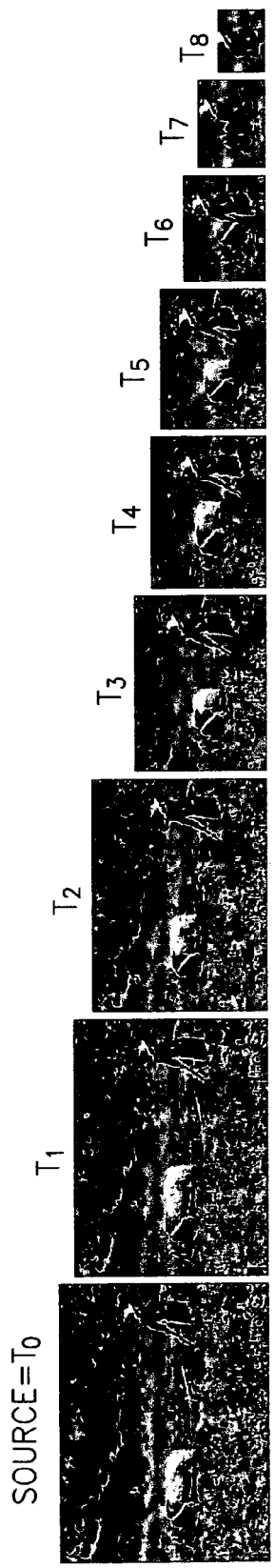
FIG. 8A is an illustration showing the result of the gradual resizing for one source image.
Figure 8B:
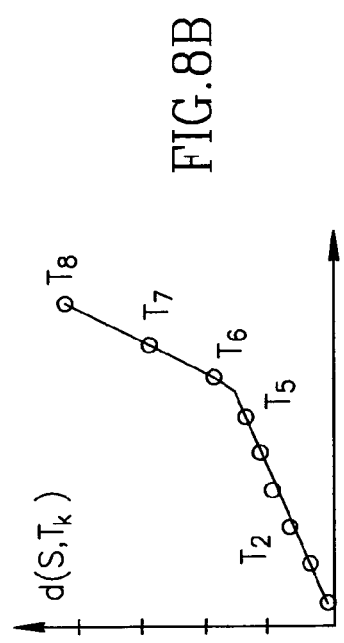
FIG. 8B is a graphical illustration of the corresponding dissimilarity measure d(S,T) for the gradual resizing of FIG. 8A.

FIGS. 8A and 8B, to which reference is now briefly made, show results of the gradual resizing and the corresponding dissimilarity measure d(S,T). In the first few images, $T_1, \ldots, T_5$, there is a slow increase in dissimilarity measure d(S,T), indicating a gradual loss of visual information. Starting from $T_6$, there is a sharp increase in d(S,T), indicating the loss of a significant amount of visual information. For example, in $T_6$ the animal's back is no longer whole. This may suggest an automatic way to identify a good stopping point in the size reduction.

It will further be appreciated that method 70 may generate target T by affecting the redundant portions of source S more than the non-redundant portion. These redundant portions may be removed, as described hereinabove, or multiplied, as shown hereinbelow.

Figure 9:
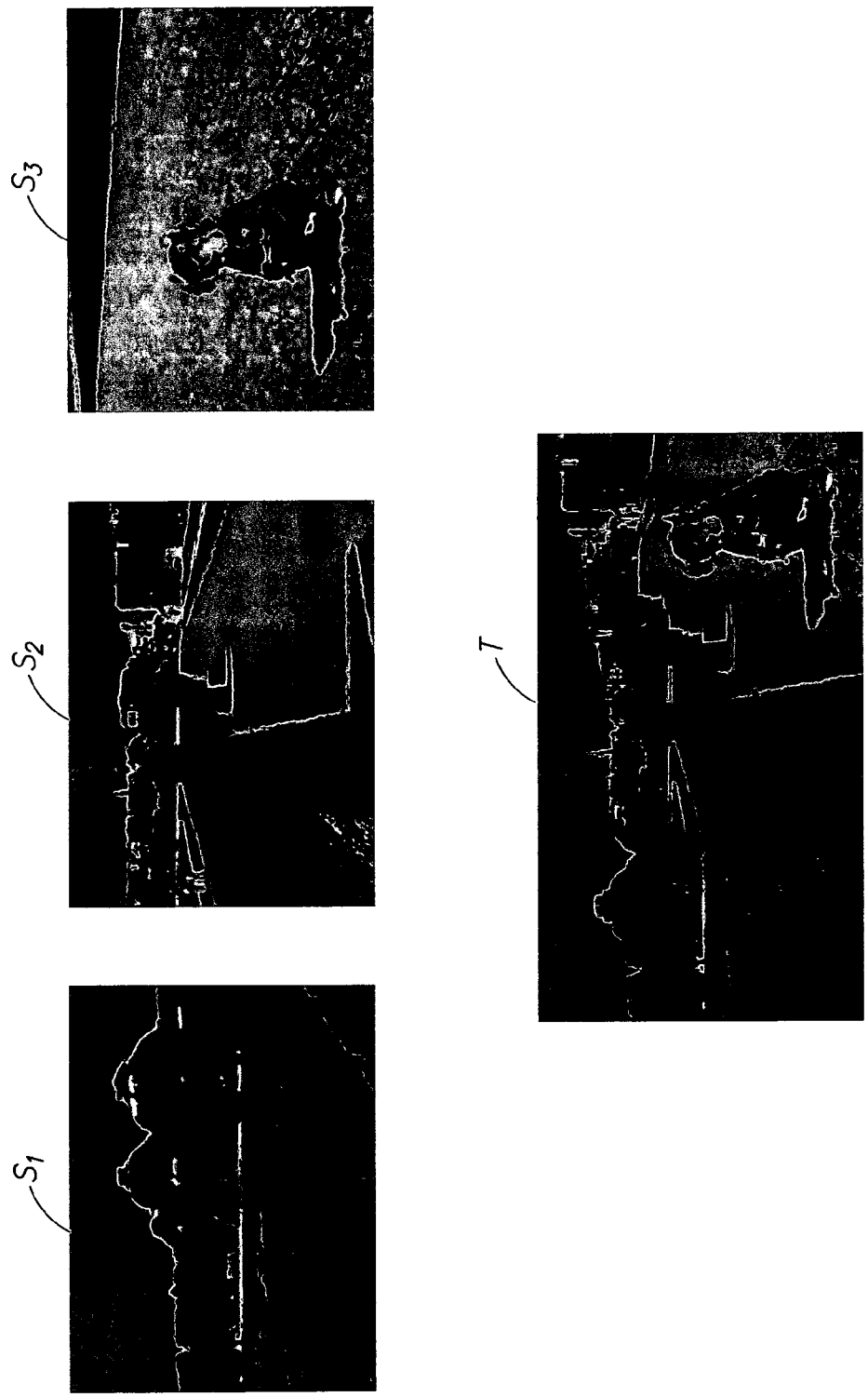
FIG. 9 is an illustration of the montage of three input images into a target image.

In accordance with a further preferred embodiment of the present invention, the source visual item may be formed of multiple source visual items (i.e., $S=\{S_1, S_2, \ldots S_n\}$), thereby to produce an image/video montage. An exemplary result from three input images, $S_1$, $S_2$ and $S_3$, is shown in FIG. 9, to which reference is now made. $S_1$ shows a formal garden in front of a large building, $S_2$ shows a formal park with paved paths and some modern buildings in the background and $S_3$ shows a girl on a park path. Completeness may guarantee that generally all patches from all input images may be found in the output montage T, while the coherence term may aid in their coherent merging. Thus, in output montage T, the girl is on one of the park paths with the modern buildings in the background and the large building to her left. Note that the output montage T did not require any further processing.

Additional steps may be applied to improve the quality and to make generating the montage easier. For example, source items may be histogram-equalized to diminish exposure differences, a logical order of the source items may be chosen as an initialization, the entire process may be done in the gradient domain, and the color may be integrated using some boundary conditions to be as close as possible to the original source colors (e.g. by solving a Poisson equation, as discussed in the article by Pérez, P., Gangnet, M, and Blake, A. 2003. Poisson image editing. *ACM Trans. Graph.* 22, 3 (July 2003), 313-318).

Similarly, montage may be applied to combine visual information from multiple video sequences into a single complete and coherent video sequence. The combination may be done in space, in time, or in both space and time.

To create a montage, completeness may be imposed with respect to all source items and coherence may be imposed with respect to any of the source items. The former requirement may attempt to have all the information appear in the output while the latter requirement may attempt to make the output locally look like a real image. Imposing coherence with respect to all source items at once, produces "morphing".

For example, if there are two sources and one target image where coherence is imposed with respect to both sources at once (by having two coherence terms in the objective function of Equation 1, then the target may tend to be as similar as possible to both source images. Mathematically, the morphing objective function may be written as:

$$d(S_A, S_B, T_1, \ldots, T_N) = \alpha[d(S_A, T_1) + d(T_1, T_2) + \ldots + d(T_{N-1}, T_N) + d(T_N, S_B)] + (1-\alpha)[w_1^A d(T_1, S_A) + w_1^B d(T_1, S_B) + w_2^A d(T_2, S_A) + w_2^B d(T_2, S_A) + \ldots + w_N^A d(T_N, S_A) + w_N^B d(T_N, S_B)]$$

subject to $$w_k^A + w_k^B = 1 \qquad (6)$$

for two sources $S_A$ and $S_B$ and N interim targets.

Alternatively, the two coherence and the completeness terms may be weighted differently, such that the target may become more similar to one of them than the other. Changing the weights gradually (and optionally starting with the previous result or a weighted average of the two sources as an initial guess), may generate a sequence of target images with a gradual "morph" from one source to the other. Weighted terms may ensure that the target be as close as desired (or identical) to one of the source, which is an important property in morphing.

If the colors in the two source images are too different, the entire process may be done in the gradient domain, and then the colors may be integrated, as mentioned hereinabove. The dimensions of the two sources need not be the same. If they are different, the target dimensions may be changed gradually from the dimensions of one source to the other, as described hereinabove.

The main objects in the two sources may or may not be aligned. If they are aligned or if there are point correspondences between the sources, the search regions may be limited to small neighborhoods around the predicted locations, leading to a significant speed-up.

The same morphing method may be performed on two source video clips, resulting in a morphed video target clip. Moreover, morphing may be performed with more than two source images/videos, by having multiple coherence and completeness terms. By using a convex sum of the weights to the source images, the target may be a morph of all sources and may be as close as desired to any of them. For example, this may be used to generate an image of a face that will be a morph of three or more source faces.

As discussed hereinabove, method 70 may be operative on video sequences and may be capable of summarizing the actions therein in a visually coherent manner. It may convey a visually pleasing summary of the actions at their original speed. On the other hand, it may also be complete in the sense that it preserves information from all parts of the longer source video.

Figure 10:
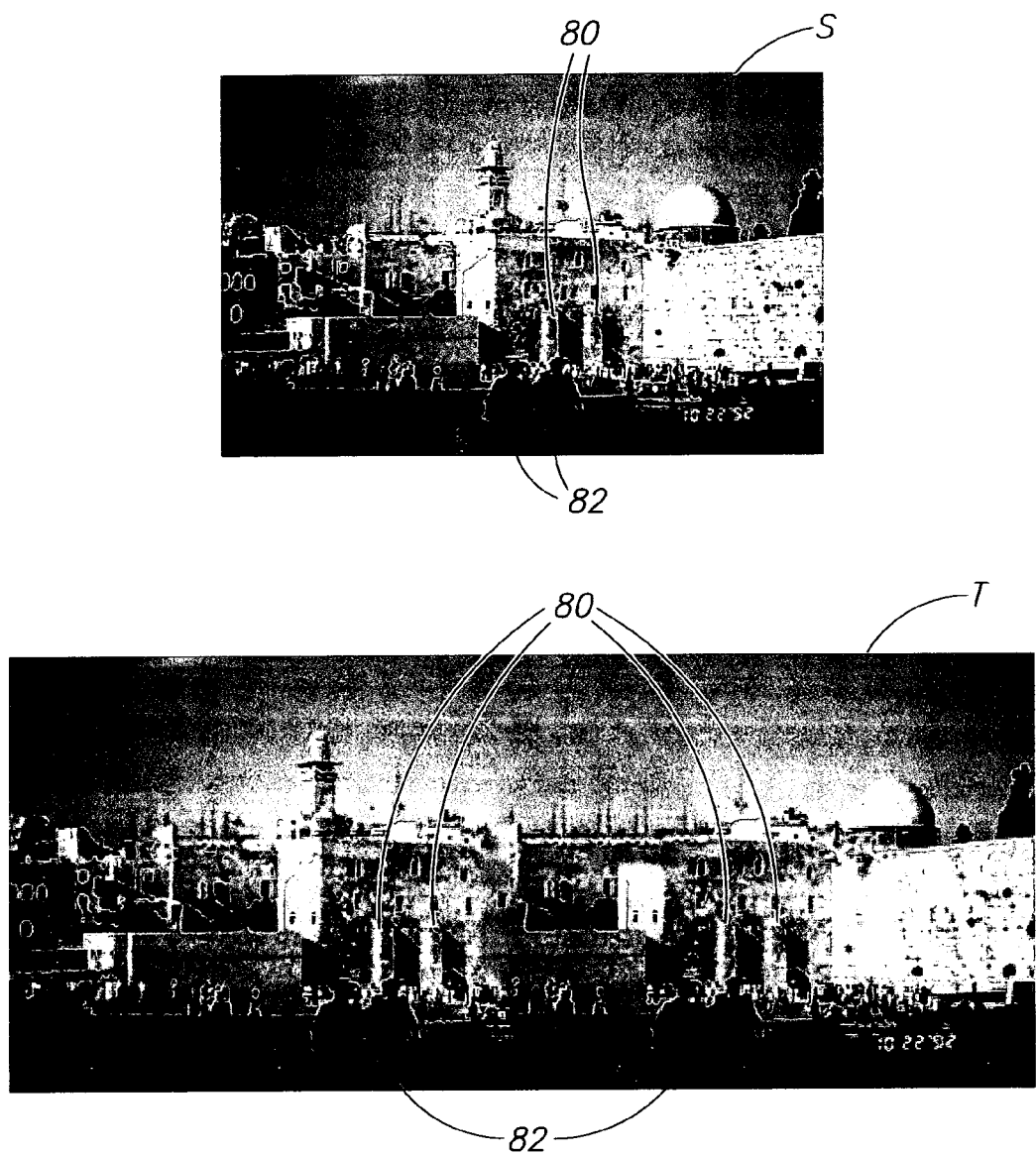
FIG. 10 is an illustration of the expansion of an input image into a larger, synthesized target image.

In accordance with a further preferred embodiment of the present invention, method 70 may be utilized to synthesize or complete visual items. In this embodiment, the target visual item may be gradually increased, and method 70 may be performed for each size, until a desired size may be achieved. FIG. 10, to which reference is now briefly made, shows a source image S, of a plaza surrounded by buildings. One part of the buildings has two columns and, in the foreground, there is a couple heading towards the building. FIG. 10 shows an output image T, of the plaza with columns 80 and people 82 repeated. Similarly, video synthesis may be achieved, by creating a larger video which combines and repeats data from the source video in a complete and coherent way.

Figure 11:
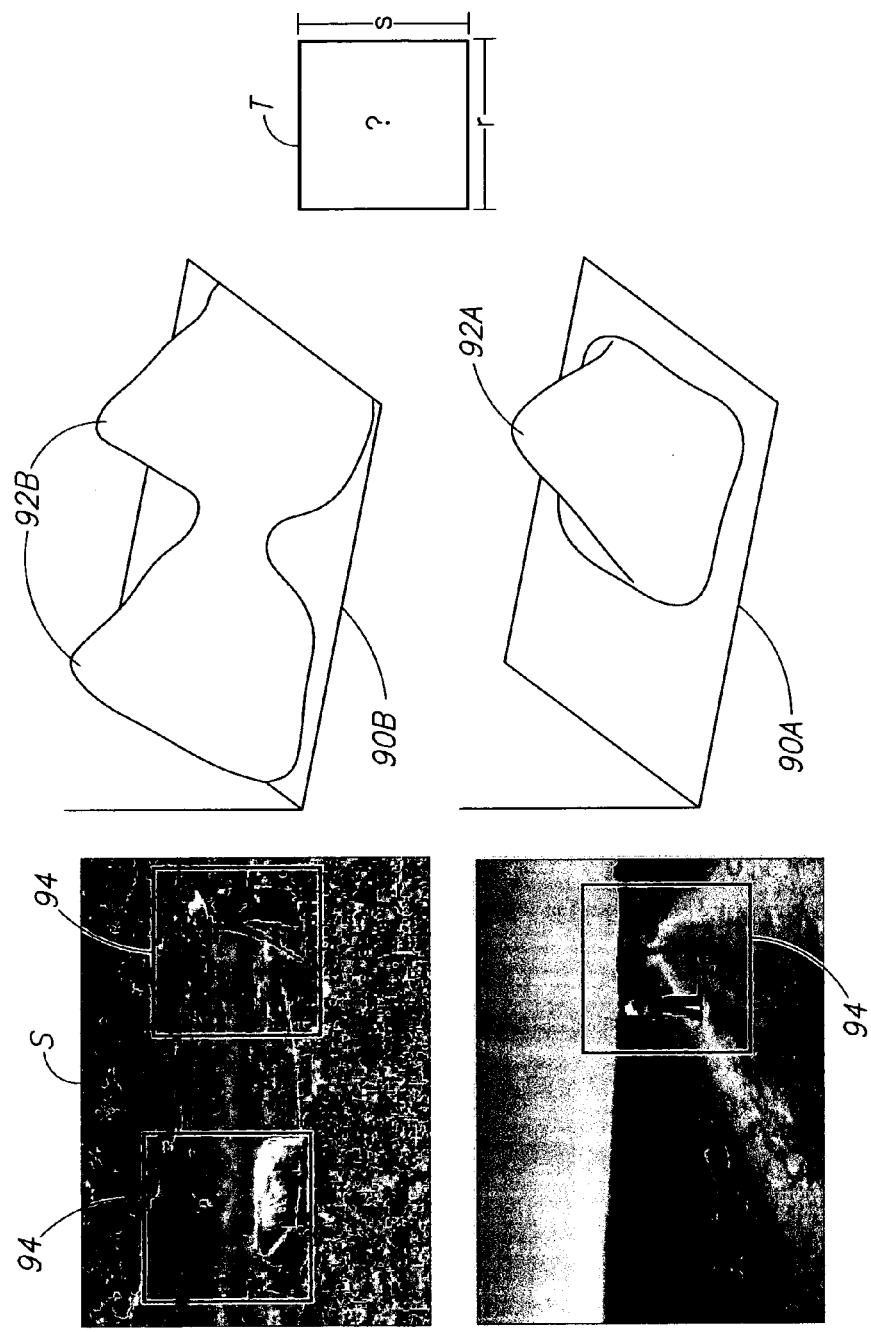
FIG. 11 is an illustration of using dissimilarity measure d(S,T) to determine a good window to crop.

Reference is now made to FIG. 11, which illustrates the use of dissimilarity measure d(S,T) to determine a good window to crop. In this embodiment, source visual item S may be a large input image, and T may be set to be the (unknown) desired cropped region of S, of predefined dimensions r×s. Method 40 may be performed with a sliding window of size r×s across S, producing the bidirectional similarity score for each pixel (the center of each window) of source S.

FIG. 11 shows two images. The first image shows a man and an ox and the second image shows a man. FIG. 11 also shows their resultant "representativity" maps, labeled 90 (representativity is defined here as the opposite to the dissimilarity: it is larger when dissimilarity d(S,T) is smaller). A peak 92 of each map 90 may be the point with the most similarity (i.e. the most information in the image) and thus, may indicate the center pixel of the best window to crop (note that in this case only the "completeness" term will affect the choice, since all sub windows of S are perfectly "coherent" with respect to S). One map 90A has one peak 92A; however, the other map 90B has multiple peaks 92B, which may serve as multiple possible locations to crop the image. Each source S is marked with a crop square 94 corresponding to the peaks 92. Note that all three crop squares 94 contain interesting items (people or animals) in them. The same approach may be used for temporal, spatial, or spatio-temporal cropping in video data using bidirectional dissimilarity measure d(S,T) with space-time patches.

Figure 12:
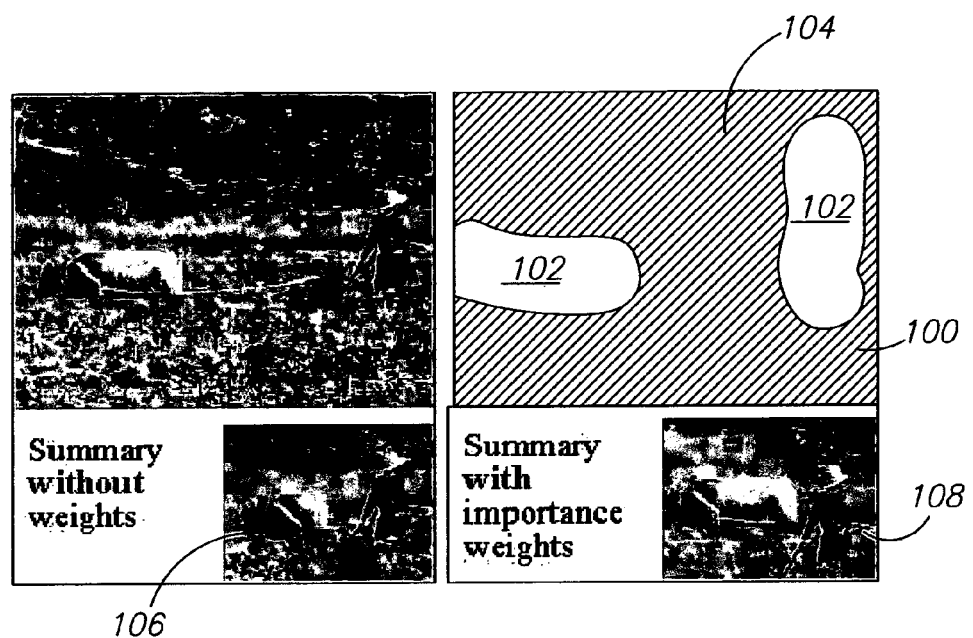
FIGS. 12 and 13 are illustrations of using importance weights in dissimilarity measure d(S,T) to preserve or remove, respectively, different regions of a visual item.

In accordance with a further preferred embodiment of the present invention, shown in FIG. 12, to which reference is now made, importance weights may be added to emphasize different regions (such as those of interesting objects, like faces) of the visual item. For video sequences, important regions and moments may be marked, allowing user guidance in creating a video summary/video trailer.

A mask 100 may be defined over an image S, where important regions may be marked by white shapes 102 (high importance weights) and unimportant regions, with low weights, may be shown by hashed regions 104. In general, white shapes 102 may not need to be accurately drawn. For the image S of FIG. 12, with the person and the ox as foreground, white shapes 102 may be drawn around each of the person and the ox.

The non-uniform importance may be incorporated into bidirectional dissimilarity measure d(S,T) by introducing importance weights $w_p$ for input patches into Eq. 1, as follows:

$$d(S, T) = \frac{\sum_{P \subset S} w_P \min_{Q \subset T} D(P, Q)}{\sum_{P \subset S} w_P} + \frac{\sum_{Q \subset T} w_{\hat{P}} \min_{\hat{P} \subset S} D(Q, \hat{P})}{\sum_{Q \subset T} w_{\hat{P}}} \quad (7)$$

where $w_p$ and $w_{\hat{p}}$ are the patch importance weights for the completeness and coherence terms, respectively, and may be defined over source visual item S. Importance weights may be more intuitively specified per pixel (and not per patch). For patches that are partly white and partly black, the patch weight may be an average (or min, max, etc.) of the mask values of the pixels in the patch.

Update rule of Eq. 5 may become:

$$T(q) = \frac{\dfrac{\sum_{j=1}^{n_q} w_{\hat{p}_j} S(\hat{p}_j)}{\sum_{Q \subset T} w_{\hat{p}}} + \dfrac{\sum_{i=1}^{m} w_{p_i} S(p_i)}{\sum_{P \subset S} w_p}}{\dfrac{\sum_{j=1}^{n_q} w_{\hat{p}_j}}{\sum_{Q \subset T} w_{\hat{p}}} + \dfrac{\sum_{i=1}^{m} w_{p_i}}{\sum_{P \subset S} w_p}} \quad (8)$$

FIG. 12 shows the results of method 70 without using weights (image 106) and with the weights (image 108). More of image 108 is taken up by the ox and person than in image 106. Without the importance weights, method 70 prefers the textured regions (e.g., the bushes in the field, etc.) over the relatively homogeneous regions (the ox), which may be semantically more important. Introduction of importance weights may solve this problem.

The importance mask may be specified by a user or computed automatically. For example, patches may be clustered, and a weight inversely proportional to the cluster size may be applied, thus assigning more importance to less frequent patches. This may avoid averaging of too many values in Eq. (5), which may occur when there are large redundant regions which are matched to a small target region. Local statistics, like edges, entropy, etc. may also be used to compute importance weights automatically. Other weights may be defined by an external method, such as by a face detector, attention detector, etc.

Figure 13:
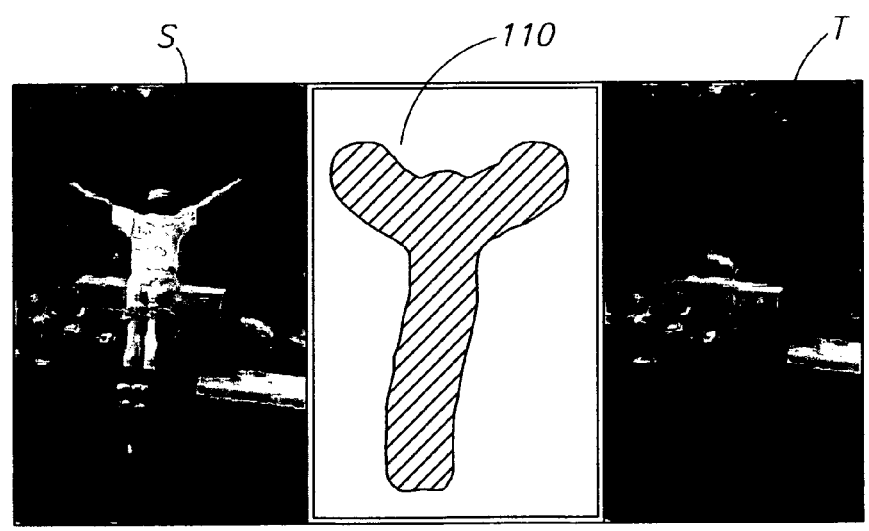

Importance weights may alternatively be utilized to remove undesired objects (i.e. to generate a summary or an output image with the undesired object removed). This is shown in FIG. 13, to which reference is now briefly made. FIG. 13 shows source image S, of a bungee jumper jumping over water with a large building on the shore, and a mask 110 with the general shape of the bungee jumper marked by hatching. Once again, white indicates high weights and hatching indicates low weights. As can be seen in target image T, the bungee jumper is not included in the visual summary. Similarly, undesired objects and/or moments may be removed from video by assigning them low importance weights.

Figure 14:
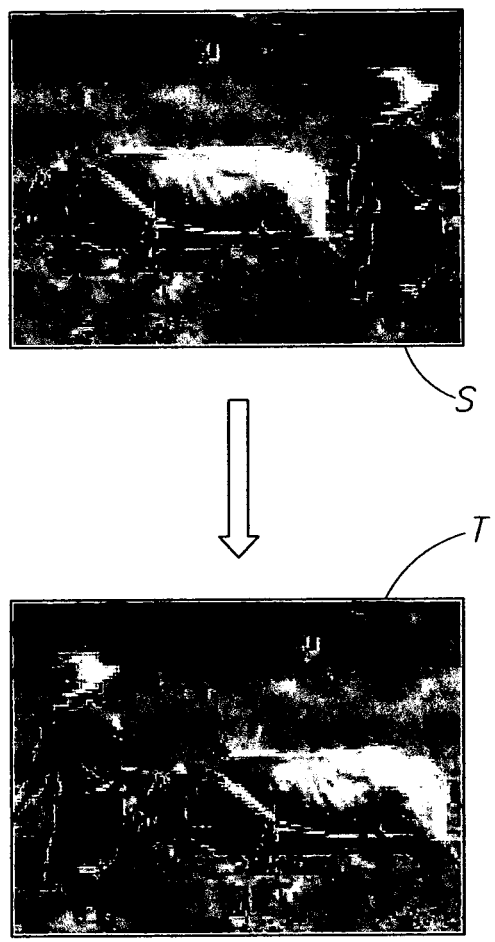
FIG. 14 is an illustration of using dissimilarity measure d(S,T) to reshuffle elements of the source image.

In accordance with a further preferred embodiment of the present invention, portions of visual items may be reshuffled with user guidance. An example of such "Photo-Reshuffling" for images is shown in FIG. 14, to which reference is now made. The source image S is the previous image of the ox and man, with the man on the right and the ox on the left. The target image T has the two objects switched; the man is now on the left and the ox is on the right.

To generate target T, the user may cut and paste the desired elements of source S into an initial, blank target (of the same size, smaller or larger than source S). The method may then initialize the rest of the target T in an arbitrary way, e.g., by putting random values, or by using resampled source at a coarse resolution, etc. If desired, a mask may be generated which may place higher importance weights to the selected elements in the output and gradually decreasing weight further from the known regions. Method 70 may then be performed on source S and the initial target T, typically in multi-scale, to grow up large regions. Method 70 may fill in the remaining parts of the visual item in a complete and coherent way.

It will be appreciated that the same operation may be performed using several source images, to create a new, artificial, but naturally looking image, composed of elements from different images. The same method may be used for reshuffling portions of video, or combining several videos in a new way, possibly changing both spatial and temporal relative locations of portions of the video. The same concepts may be utilized for editing source S, where target T is the edited version of source S.

It will be appreciated that method 70 may create outputs of non-rectangular shape. For example, the target image might be round or in any other desired shape, such as a butterfly, an animal, etc. Round images might be useful for CD covers while animal shapes might be useful for stickers of photos of children. Similarly, photo collages with non-rectangular shapes may be created.

Alternatively, method 70 may create outputs on arbitrary or non-planar surfaces. A summary/photo collage may be embedded on a cylinder or a sphere, with opposite sides connected to one another. The task is to make the embedded image look pleasant locally everywhere. On the opposite: an image on a surface may be retargeted to a plane: e.g., a flat Earth map may be created from a spherical globe. Similarly, method 70 may be used to transfer an image from one arbitrary surface to another arbitrary surface, preserving local appearance.

The method may also operate with non-visual items, like 3D shapes (3D models, "range maps", "depth maps"). A large 3D shape (e.g., 3D texture of a field, a 3D bush or tree model) may be retargeted into a smaller shape, removing 3D redundancy in a complete and coherent way. Similarly a 4D animation (dynamic 3D shape that evolves over time) may be retargeted into another 4D animation.

Method 70 may also be used to detect a texture "seed", which may be a representative portion of a larger texture. Such texture seeds may be used to generate large texture regions, e.g., a single brick is a basic building block of a brick wall. Method 70 may reduce a large texture to a very small size, from which such texture seeds may be generated. This may be useful in the areas of computer graphics, computer games, etc.

It will be appreciated that methods 40 and 70 may also be utilized in the following applications: to compactly summarize visual data (images or videos), to generate photo "thumbnails", to adapt large-resolution images and videos to smaller displays (PDA, cellular telephones, etc), to generate short cliplets representing longer videos (e.g., "video thumbnails") and to generate a photo or video collage. It may also be utilized to summarize the content of a folder which has images in it, to generate a "mosaic" (or a panorama) from a video or to generate a smaller image or video while removing unwanted (user-specified) objects. It may provide means for generally optimal cropping of an image or video, to shorten a video sequence while preserving the activity therein (such as for review of surveillance material), to enlarge or extend an image or video, to fill in missing visual information, to synthesize images and/or videos, and for generating dynamic video mosaics.

In accordance with another preferred embodiment of the present invention, the similarity measure described hereinabove may be implemented as a distance measure (between images or videos of possibly different sizes) in all types of applications where visual items are compared with each other. For example, an application for the classification of visual items or parts thereof into categories may utilize a distance measure between each pair of visual items in a given population of visual items. In another example, applications for searching through visual items to find a visual item which is similar to a query also utilize distance measures between visual items. Such applications include image retrieval and search, object recognition, image classification, categorization, action classification/recognition/categorization, scene classification/recognition/categorization, etc.

In particular, an image/video may be compared against or searched within a database of images/videos (e.g., a digital library, the Internet, etc.). Similarly, an image (or part of it) may be searched within a video sequence, a part of video may be searched in the full video to find similar moments/locations, etc.

Unless specifically stated otherwise, as apparent from the previous discussions, it is appreciated that the present invention may be implemented in any kind of software. Thus, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for measuring bi-directional similarity between a first signal of a first size and a second signal of a second size, the method comprising:
   for data completeness, matching at least some patches of said first signal with patches of said second signal;
   for data coherence, matching at least some patches of said second signal with patches of said first signal;

calculating said bi-directional similarity measure as a function of said matched patches for coherence and said matched patches for completeness; and indicating the similarity between said first signal and said second signal.

2. The method according to claim 1 wherein at least one of said signals is one of the following: a multiplicity of signals and a portion of a signal.

3. A method according to claim 1 and operative for at least one of the following applications: classification, search, retrieval, signal categorization, detection and finding a cropping region of said first signal.

4. The method according to claim 1 and wherein said signals are at least one of: audio signals, images, video sequences and N-dimensional signals.

5. The method according to claim 1 and wherein said patches are at least one of the following: spatial patches, temporal patches, space-time patches and N-dimensional patches.

6. The method according to claim 1 and wherein said patches are represented by patch descriptors.

7. The method according to claim 1 and wherein said calculating comprises evaluating a distance between a patch and its matched patch.

8. The method according to claim 7 and wherein said evaluating is performed using at least one of the following distance measures: SSD, SAD, Lp-distance, Frobenious norm, correlation, normalized correlation, mutual information, KL (Kullback-Leibler)-distance, EMD (earth-mover's distance), Hamming distance and distances between empirical distributions.

9. The method according to claim 1 and wherein said matching is computed in at least one scale.

10. The method according to claim 1 and wherein said similarity is measured by:

$$d(S, T) = \alpha \cdot \overbrace{\frac{1}{N_S} \sum_{P \subset S} \min_{Q \subset T} D(P, Q)}^{d_{complete}(S,T)} + (1 - \alpha) \cdot \overbrace{\frac{1}{N_T} \sum_{Q \subset T} \min_{P \subset S} D(Q, P)}^{d_{cohere}(S,T)}$$

where S is said first signal, T is said second signal, P and Q are patches in S and T, respectively, $N_S$ and $N_T$ denote the number of patches in S and T, respectively, and $0 \leq \alpha \leq 1$.

11. The method according to claim 1 and wherein said calculating comprises utilizing importance weights for said patches.

12. The method according to claim 11 and wherein said importance weights are at least one of: provided externally and a function of information in at least one of said signals.

13. A method for generating a second signal from a first signal, said second signal different than said first signal by at least one parameter, the method comprising:

attempting to maximize a bi-directional similarity measure between said second signal and said first signal;

and wherein said bi-directional similarity measure measures the level of completeness and coherence of said second signal with respect to said first signal.

14. The method according to claim 13 and wherein said at least one parameter is at least one of the following: size, dimension, aspect ratio, and geometric shape.

15. The method according to claim 13 and wherein said first and second signals are visual items.

16. The method according to claim 13 and wherein said generating comprises generating a progression of intermediate signals from said first signal to said second signal, wherein each intermediate signal is as complete and coherent as possible with respect to said first signal.

17. The method according to claim 13 and wherein said generating is operative for at least one of the following operations: signal/image/video summarization, image/video thumbnail generation, morphing from said first signal to said second signal, texture warping, signal/image/video synthesis, image/video collage/montage, signal combination, signal reshuffling, reshuffling portions of signals and removal of portions of signals.

18. The method according to claim 13 and wherein said first and second signals are of different signal types.

19. The method according to claim 18 and wherein said signals are of the following pairs: video sequence and image, image and three dimensional color surface, image and mesh, a three dimensional color surface and an image, and a photo collage and a three dimensional color surface.

20. The method according to claim 13 and wherein said signals are three dimensional shapes and said second signal is a shape summary of said first signal.

21. The method according to claim 13 and wherein said generating is operative to extract a texture seed useful for synthesizing a new similar texture.

22. The method according to claim 13 and wherein said attempting to maximize comprises:

starting with at least one initial guess for said second signal;

matching patches of said second signal with patches of said first signal for coherence;

matching patches of said first signal with patches of said second signal for completeness; and updating values of said second signal using data from said matched patches to increase completeness and coherence.

23. The method according to claim 22 and wherein said updating comprises utilizing importance weights for said patches.

24. The method according to claim 23 and also comprising determining said weights as a function of information in at least one of said signals.

25. The method according to claim 23 and wherein said importance weights are at least one of: provided externally and a function of information in at least one of said signals.

26. The method according to claim 22 and comprising:

iterating said matching and said updating; and using locations of matches from a previous iteration to increase a matching speed for said iterating.

27. The method according to claim 22 and wherein said patches are at least one of the following: spatial patches, temporal patches, space-time patches and N-dimensional patches.

28. The method according to claim 22 and wherein said patches are represented by patch descriptors.

29. The method according to claim 28 and wherein said evaluating is performed using at least one of the following distance measures: SSD, SAD, Lp-distance, Frobenious norm, correlation, normalized correlation, mutual information, KL (Kullback-Leibler)-distance, EMD (earth-mover's distance), Hamming distance and distances between empirical distributions.

30. The method according to claim 22 and wherein said updating comprises evaluating a distance between a patch and its matched patch.

31. The method according to claim 22 and wherein said matching and updating is computed in at least one scale.

32. The method according to claim 22 and wherein said starting comprises:

receiving a selection of at least one portion of said first signal; and receiving an indication of at least one location in at least one of space and time in which to place said selection into said initial guess.

33. The method according to 13 and also comprising:
determining a best size of said second signal according to values of said similarity measure.

34. Apparatus for generating a second signal from a first signal, said second signal different than said first signal by at least one parameter, the apparatus comprising:
a generator to attempt, during generation, to maximize a bi-directional similarity measure between said second signal and said first signal;
and wherein said bi-directional similarity measure measures the level of completeness and coherence of said second signal with respect to said first signal.

35. The apparatus according to claim 34 and wherein said at least one parameter is at least one of the following: size, dimension, aspect ratio, and geometric shape.

36. The apparatus according to claim 34 and wherein said first and second signals are visual items.

37. The apparatus according to claim 34 and wherein said generator comprises means to generate a progression of intermediate signals from said first signal to said second signal, wherein each intermediate signal is as complete and coherent as possible with respect to said first signal.

38. The apparatus according to claim 34 and wherein said apparatus is operative for at least one of the following operations: signal/image/video summarization, image/video thumbnail generation, morphing from said first signal to said second signal, texture warping, signal/image/video synthesis, image/video collage/montage, signal combination, signal reshuffling, reshuffling portions of signals and removal of portions of signals.

39. The apparatus according to claim 34 and wherein said first and second signals are of different signal types.

40. The apparatus according to claim 39 and wherein said signals are of the following pairs: video sequence and image, image and three dimensional color surface, image and mesh, a three dimensional color surface and an image, and a photo collage and a three dimensional color surface.

41. The apparatus according to claim 34 and wherein said signals are three dimensional shapes and said second signal is a shape summary of said first signal.

42. The apparatus according to claim 34 and wherein said apparatus is operative to extract a texture seed useful for synthesizing a new similar texture.

43. The apparatus according to claim 34 and wherein said generator comprises:
a starter to start with at least one initial guess for said second signal,
a matcher to match patches of said second signal with patches of said first signal for coherence and to match patches of said first signal with patches of said second signal for completeness; and
an updater to update values of said second signal using data from said matched patches to increase completeness and coherence.

44. The apparatus according to claim 43 and wherein said updater comprises a weighter to utilize importance weights for said patches.

45. The apparatus according to claim 44 and also comprising a weight determiner to determine said weights as a function of information in at least one of said signals.

46. The apparatus according to claim 44 and wherein said importance weights are at least one of: provided externally and a function of information in at least one of said signals.

47. The apparatus according to claim 43 and comprising:
an iterater to iteratively activate said matcher and said updater, said iterater using locations of matches from a previous iteration to increase a matching speed of a current iteration.

48. The apparatus according to claim 43 and wherein said patches are at least one of the following: spatial patches, temporal patches, space-time patches and N-dimensional patches.

49. The apparatus according to claim 43 and wherein said patches are represented by patch descriptors.

50. The apparatus according to claim 49 and wherein said evaluater utilizes using at least one of the following distance measures: SSD, SAD, Lp-distance, Frobenious norm, correlation, normalized correlation, mutual information, KL (Kullback-Leibler)-distance, EMD (earth-mover's distance), Hamming distance and distances between empirical distributions.

51. The apparatus according to claim 43 and wherein said updater comprises an evaluator to evaluate a distance between a patch and its matched patch.

52. The apparatus according to claim 43 and wherein said matcher and updater operate at at least one scale.

53. The apparatus according to claim 43 and wherein said starter comprises:
a selection receiver to receive a selection of at least one portion of said first signal; and
an indication receiver to receive an indication of at least one location in at least one of space and time in which to place said selection into said initial guess.

54. The apparatus according to 34 and also comprising:
a size determiner to determine a best size of said second signal according to values of said similarity measure.

\* \* \* \* \*

UNITED STATES PATENT AND TRADEMARK OFFICE
CERTIFICATE OF CORRECTION

| | | |
|---|---|---|
| PATENT NO. | : 8,542,908 B2 | |
| APPLICATION NO. | : 12/598450 | |
| DATED | : September 24, 2013 | |
| INVENTOR(S) | : Denis Simakov et al. | |

It is certified that error appears in the above-identified patent and that said Letters Patent is hereby corrected as shown below:

On the Title Page, Item (75) Inventor, the fourth inventor's name should read:

Eli Shechtman

Signed and Sealed this
Fifth Day of November, 2013

Teresa Stanek Rea
*Deputy Director of the United States Patent and Trademark Office*